United States Patent
Chin et al.

(10) Patent No.: US 9,292,869 B2
(45) Date of Patent: Mar. 22, 2016

(54) SYSTEM AND METHOD FOR DEFAULT PAYMENT SETTING

(71) Applicant: American Express Travel Related Services Company, Inc., New York, NY (US)

(72) Inventors: Cindy E. Chin, New York, NY (US); I-Hsin Chuang, Brooklyn, NY (US); Christopher Fred, Highland Mills, NY (US); Carrie L. Parker, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 13/655,189

(22) Filed: Oct. 18, 2012

(65) Prior Publication Data

US 2013/0232046 A1    Sep. 5, 2013

Related U.S. Application Data

(63) Continuation of application No. 13/409,882, filed on Mar. 1, 2012, now abandoned.

(51) Int. Cl.
G06Q 40/00    (2012.01)
G06Q 30/06    (2012.01)
G06Q 20/02    (2012.01)

(52) U.S. Cl.
CPC ............. G06Q 30/06 (2013.01); *G06Q 20/02* (2013.01)

(58) Field of Classification Search
USPC .................... 705/35, 38, 39, 40, 44, 21
See application file for complete search history.

(56) References Cited

U.S. PATENT DOCUMENTS

| 2010/0082445 A1* | 4/2010 | Hodge ............... G06Q 20/10 705/21 |
| 2011/0178924 A1* | 7/2011 | Briscoe ............. G06Q 20/105 705/41 |
| 2012/0209735 A1* | 8/2012 | Subramanian et al. ...... 705/26.1 |

* cited by examiner

*Primary Examiner* — Ojo Oyebisi
(74) *Attorney, Agent, or Firm* — Snell & Wilmer L.L.P.

(57) ABSTRACT

A consumer accesses a secure area of a transaction account website and provides their login information for retail websites. The transaction account issuer or a third party creates a script that logs in to the retail websites on behalf of the consumer and transmits transaction account information associated with the transaction account. The script sets the transaction account as the default payment method for the retail website. The transaction account information may be evergreen, such that whenever the transaction account information changes, the script updates the retail websites.

16 Claims, 8 Drawing Sheets

```
┌─────────────────────────────────────────────────────────┐
│  ONLINE INTERFACE LOGIN PAGE                       300  │
│                                                         │
│                                                         │
│            LOGIN:     [            ]                    │
│                                                         │
│            PASSWORD:  [            ]                    │
│                                                         │
│            REMEMBER ME  ☐      [ LOGIN ]                │
│                                                         │
│                                                         │
└─────────────────────────────────────────────────────────┘
```

*FIG. 3*

WELCOME CUSTOMER 400

| HOME | YOUR ACCOUNT | PARTNER MERCHANTS | MEMBERSHIP REWARDS |

SELECT DESIRED MERCHANT | LOGIN CREDENTIALS

☐ MERCHANT 'A'  [USERNAME] [PASSWORD]
☐ MERCHANT 'B'  [USERNAME] [PASSWORD]
☐ MERCHANT 'C'  [USERNAME] [PASSWORD]
☐ MERCHANT 'D'  [USERNAME] [PASSWORD]
☐ MERCHANT 'E'  [USERNAME] [PASSWORD]
☐ MERCHANT 'F'  [USERNAME] [PASSWORD]
☐ MERCHANT 'G'  [USERNAME] [PASSWORD]

```
WELCOME CUSTOMER                                          600

HOME  PAYMENT METHODS   PURCHASE HISTORY  PRODUCTS

☐        TRANSACTION ACCOUNT A

☐        TRANSACTION ACCOUNT B

☐        TRANSACTION ACCOUNT C

☑   TRANSACTION ACCOUNT FROM TRANSACTION ACCOUNT ISSUER

SET DEFAULT PAYMENT METHOD
```

*FIG. 6*

SYSTEM AND METHOD FOR DEFAULT PAYMENT SETTING

CROSS-REFERENCE TO RELATED APPLICATIONS

This application is a continuation of and claims priority to U.S. application Ser. No. 13/409,882 filed on Mar. 1, 2012 and entitled "System and Method for Default Payment Setting," which is incorporated herein by reference in its entirety.

BACKGROUND OF THE DISCLOSURE

1. Field of Disclosure

The disclosure generally relates to default payment setting methods, and more particularly to systems and methods for setting a transaction account associated with a consumer as a default payment method for a merchant account on behalf of the consumer.

2. Related Art

Electronic commerce, commonly known as e-commerce, is becoming very popular. The number of e-commerce transactions and average amount per e-commerce transaction are also increasing rapidly. Many merchants, including product retailers, financial service providers, travel operators, departmental stores, online sales portals for example, Amazon, E-bay etc.) and the like, allow consumers to browse through the merchants' product/service catalogue and pay for a desired product/service online via their transaction account. Examples of a transaction account may include, but are not limited to, credit cards, debit cards, pre-paid cards, etc. To make the payment for the desired product/service, the consumer may need to enter transaction account information, such as, transaction account number, name of a transaction account holder, expiration date, payment authorization code etc., on the merchant's website. Some merchants also allow the consumer to save the transaction account information in the consumer's login account so that the consumer may not need to enter the transaction details each time the consumer performs a financial transaction with that merchant.

It is becoming very common for the consumers to own multiple transaction accounts. In such situations, a consumer may need to enter corresponding transaction account information on the login accounts for each merchant separately as one of multiple payment methods. This is a very cumbersome process and may be time consuming. Further, when the consumer has multiple transaction accounts added to her login account, the consumer is presented with a list of transaction accounts and needs to select one of the transaction accounts as payment method for completing the financial transaction, thereby slowing the check-out. In addition, in an event of an update in the transaction account information associated with the consumer, the consumer needs to update the transaction account information in every merchant portal where that transaction account is added as one of the payment methods.

Thus, there is a need for a method, system and/or program for a more efficient technique for setting payment method.

SUMMARY OF THE DISCLOSURE

The present disclosure meets the above-identified need by providing methods, systems and non-transitory computer-readable storage medium for setting a default payment process.

The present disclosure includes systems, methods, and articles of manufacture for setting a default payment method. The method may comprise validating transaction account login credentials for a transaction account associated with a consumer. The method may comprise displaying a list of a plurality of merchants, such that the consumer may be prompted to select desired merchants. The method may comprise requesting merchant login credentials associated with the consumer. The method may comprise using the merchant login credentials to access one or more merchant account associated with the consumer. The method may include instructing the merchant account to make the transaction account the default payment method.

The method may further include transmitting transaction account information associated with the transaction account to the merchant account. The transmitting may occur in response to a consumer updating the transaction account information.

The method may further include accessing the merchant account at periodic intervals and determining whether the transaction account is the default payment method.

The method may further include determining that the consumer is not associated with a merchant account, and creating a merchant account for the consumer. The consumer may be prompted to select from a plurality of individual accounts associated with the transaction account to make the default payment method. For example, if there are multiple transaction cards associated with the transaction account, the consumer may select which transaction card should be used as the default payment method.

The method may further include using roboscripting in order to access the merchant account and modify settings on the merchant account on behalf of the consumer. The method may further include attempting to access the merchant account and determining that the merchant login credentials have changed or are otherwise invalid. The consumer may be requested to provide the current merchant login credentials so the merchant account may be accessed on behalf of the consumer.

In various embodiments the consumer may access a merchant account and indicate that they would like a transaction account issuer to provide the transaction account information to the merchant account. The transaction account issuer may receive a request for the transaction account information from the merchant account and transmit a request to the consumer for permission to transmit the transaction account information to the merchant.

The method may further include storing merchant login credentials for a plurality of merchant account associated with the consumer in a database, and in response to determining that the transaction account information has been updated, accessing the plurality of merchant account using the merchant login credentials and transmitting updated transaction account information to the plurality of merchant account.

Further features and advantages of the present disclosure as well as the structure and operation of various embodiments are described in detail below with reference to the accompanying drawings.

BRIEF DESCRIPTION OF THE DRAWINGS

The features and advantages of the disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

FIG. 3 is an exemplary login page on an example online interface of a transaction account issuer, according to various embodiments;

FIG. 4 is the exemplary online interface of the transaction account issuer, according to various embodiments;

FIG. 6 is an exemplary interface for accessing the merchant account associated with the consumer in the merchant portal, according to various embodiments;

DETAILED DESCRIPTION OF THE DISCLOSURE

Figure 1:
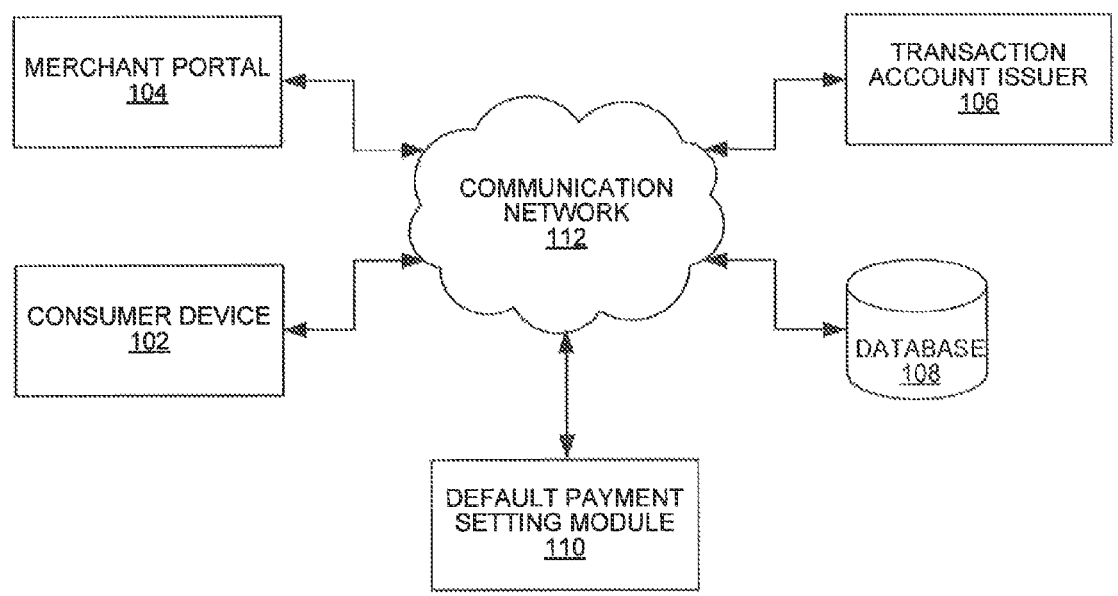
FIG. 1 is an exemplary environment in which a default payment setting module may be deployed, according to various embodiments.

The detailed description of exemplary embodiments herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The disclosure is described herein with reference to system architecture, block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The terms "merchant" shall mean any person, entity, distributor system, software and/or hardware which is a provider, broker and/or any other entity in the distribution chain of goods or services. For example, a merchant may be an on-line merchant associated with a grocery store, a retail store, a travel agency, a service agency or the like. The merchant may be a small, medium or large sized business entity.

A "consumer", as used herein, may include any individual, business, entity, group, charity, software and/or hardware that have a transaction account associated with an issuer. It is noted that the terms "customer," "consumer," "transaction account holders", "user" and "population" are used interchangeably herein.

Phrases and terms similar to "transaction account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. For example, a transaction account may be distributed in nonphysical embodiments such as an account number, frequent-flyer account, telephone calling account or the like. Furthermore, a physical embodiment of a transaction account may be distributed as a financial instrument.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

A term "consumer device", used herein refers to a computing unit or system. The computing unit or system may take the form of a computer or set of computers, although other types of computing units or systems may be used, including laptops, notebooks, hand held computers, set-top boxes, workstations, computer-servers, main frame computers, minicomputers, PC servers, pervasive computers, network sets of computers, and/or the like.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The systems, methods and computer program products disclosed in conjunction with various embodiments are embodied in systems and methods for default payment setting. The nomenclature "default payment setting" is only exemplary and used for descriptive purposes, and should not be construed to limit the scope of the disclosure.

The disclosure is now described in more detail herein in terms of the above disclosed exemplary embodiments of system, processes and computer program products. This is for convenience only and is not intended to limit the application of the disclosure. In fact, after reading the following description, it will be apparent to one skilled in the relevant ails) how to implement the following disclosure using any combination of certain portions or all of the various embodiments.

FIG. 1 shows an exemplary environment 100 in which the system and method may be utilized, in accordance with various embodiments. Environment 100 may include at least one consumer device, such as a consumer device 102, at least one merchant portal, such as a merchant portal 104, a transaction account issuer 106, a database 108, and a default payment setting module 110, and a communication network 112. Consumer device 102, merchant portal 104, transaction account issuer 106, database 108, and default payment setting module 110 may communicate with each other over communication network 112. Examples of communication network 112 may include, but are not limited to, a wide area network (WAN), a local area network (LAN), an Ethernet, Internet, an Intranet, a cellular network, a satellite network, or any other suitable network for transmitting data. Communication network 112 may be implemented as a wired network, a wireless network or a combination thereof.

Consumer device 102 may be any device capable of communicating with merchant portal 104, transaction account issuer 106 and default payment setting module 110 through communication network 112. In various embodiments, consumer device 102 may be a data processing system such as, for example, a mobile device, any suitable personal computer, a laptop, minicomputer, Personal Digital Assistant (PDA), or the like. Those skilled in art can appreciate that client device 114 may include an operating system (e.g., Windows NT, 95/98/2000, OS2, UNIX, Linux, Solaris, MacOS, etc.) as well as various conventional support software and drivers typically associated with computer. Consumer device 102 may also include an internal memory, an external memory and a cache. Consumer device 102 may also include one or more browsers (e.g., Microsoft® Internet explorer, Mozilla® Firefox, etc) through which an email server may be accessed. Alternatively, consumer device 102 may include a client email program such as a Microsoft® Outlook, Mozilla® Thunderbird, Pegasus® Mail, and the like, for downloading, reading, replying and/or forwarding the email. Although a single consumer device 102 is illustrated herein for exemplary purposes, one skilled in art can appreciate that there can be more than one consumer device 102.

Merchant portal 104 may include any hardware and/or software suitably configured to facilitate input, receipt and/or review of information relating to goods or services. As those skilled in the art will appreciate, merchant 104 may include an operating system (e.g., Windows NT, 95/98/2000, OS2, UNIX, Linux, Solaris, MacOS, etc.) as well as various conventional support software and drivers typically associated with computers. Further, merchant portal 104 may include any suitable personal computer, network computer, workstation, minicomputer, mainframe or the like. Furthermore, merchant portal 104 may be in a home or business environment with access to a network. Consumer may communicate with merchant portal 104 through consumer device 102 to perform one or more financial transaction in response to merchant portal 104 provides one or more services or products to the consumer.

Transaction account issuer 106 may be a financial institution that issues a transaction account to the consumer. The transaction account may include one or more of individual accounts, such as banking accounts, debit card, charge card, credit card and the like. The transaction account may have associated transaction account information.

Database 108 may store merchant login credentials associated with the consumer. The merchant login credentials are required by the consumers to access merchant portal 104 to perform an online financial transaction through the transaction account associated with the consumer. Database 108 may also store the information associated with the transaction account of the consumer. The information may include, but is not limited to, transaction account number, an expiration date, a billing address, a security code, a routing number, a password, a consumer name, a consumer birth date, and a personal identification number. In various embodiments, database 108 may be updated in real time by the consumer, default payment setting module 110 and transaction account issuer 106. The consumer and/or transaction account issuer 106 may update information associated with the transaction account of the consumer in real time on database 108. Further, default payment setting module 110 may store the merchant login credentials associated with the consumer on database 108 and may update database 108 in response to receiving the updated merchant login credentials from the consumer. Default payment setting module 110 may perform a periodic check on database 108 to determine if information associated with transaction account of the consumer is updated. Transaction account issuer 106, and default payment setting module 110 may communicate with database 108 through communication network 112.

Database 108 may employ any type of database, such as relational, hierarchical, graphical, object-oriented, and/or other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various exemplary embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of database 108, the data can be stored without regard to a common format. However, in one exemplary embodiment of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer (operator of default payment setting module 110), customers or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand-alone device, the appropriate option for the action to be taken. Database 108 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of database 108 may consist of any combination thereof at a single location or at multiple locations, wherein each database or system includes any of various suitable security features, such as firewalls, access codes, encryption, decryption, compression, decompression, and/or the like.

In various embodiments, default payment setting module 110 may facilitate in setting a transaction account associated with the consumer as a default payment method on a merchant account. Default payment setting module 110 may allow the consumer to select one or more desired merchants on which the consumer wants to set the transaction account as the default payment method. Default payment setting module 110 may run a script on the computer based system, so that the system may log in to the desired merchant portal 104 on behalf of the consumer and set the transaction account associated with the consumer as default payment method on the merchant account for the desired merchant portal 104.

The disclosure may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Referring now to FIGS. 2-7 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-7, but also to the various system components as described above with reference to FIG. 1.

Figure 2:
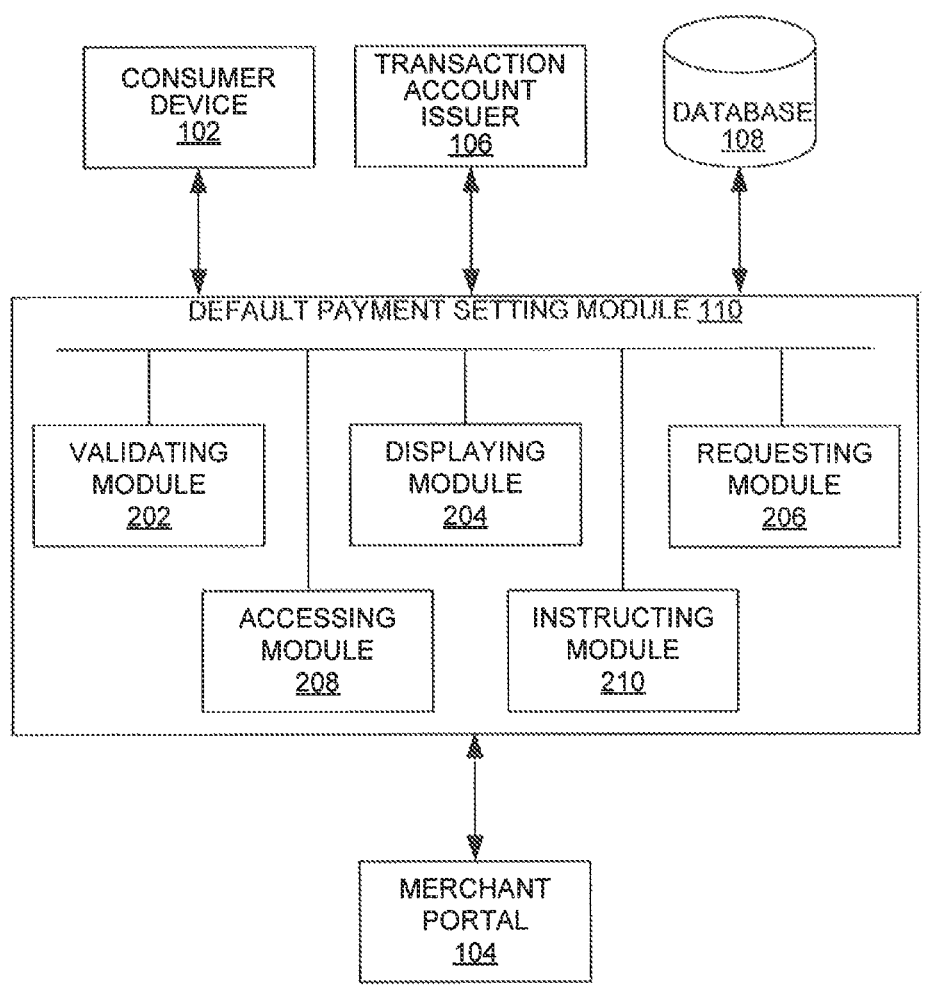
FIG. 2 is an exemplary implementation of the default payment setting module for setting a transaction account associated with a consumer as default payment method on a merchant account, according to various embodiments.

Referring to FIG. 2, default payment setting module 110 is depicted, according to various embodiments. As shown in FIG. 2, default payment setting module 110 may include a validating module 202, a displaying module 204, a requesting module 206, an accessing module 208, and an instructing module 210.

As shown in FIG. 2, default payment setting module 110 may be configured to communicate with database 108 through communication network 112. In various embodiments, default payment setting module 110 may be implemented on a server of transaction account issuer 106 or on a server of a third party service provider.

In various embodiments, the consumer communicates with transaction account issuer 106 through communication network 112. The consumer may provide transaction account login credentials associated with the transaction account of the consumer on an online interface associated with transaction account issuer 106. In various embodiments, the online interface may include a secure area of a transaction account website. Subsequently, validating module 202 may validate the login credentials of the transaction account associated with the consumer and may provide an access to the online interface associated with transaction account issuer 106. In various embodiments, validating module 202 may request the consumer to re-enter the login credentials if the login credentials provided by the consumer are invalid. Validating module 202 may communicate with database 108 to validate the login credential of the consumer.

In response to a successful login into the online interface associated with transaction account issuer 106, the consumer may select to access a list of merchants from the online interface. In response to the selection, displaying module 204 may display a plurality of merchants to the consumer. In various embodiments, the displayed merchants may have one or more business contracts with transaction account issuer 106.

Subsequently, requesting module 206 may request that the consumer select the one or more merchants as desired merchants from the displayed list, on which the consumer may wish to set his/her transaction account as a default payment method. Requesting module 206 may further request the consumer to provide the merchant login credentials associated with the consumer for the desired merchants. In various embodiments, default payment setting module 110 may store the merchant login credentials associated with the consumer in database 108 for future retrieval.

In response to receiving the merchant login credentials from the consumer, accessing module 208 may access merchant portal 104 associated with the desired merchants, using the merchant login credentials received from the consumer. Accessing module 208 may further access the merchant account associated with the consumer on merchant portal 104. The merchant account may include one or more payment methods added by the consumer to perform a financial transaction through merchant portal 104. Accessing module 208 may access the merchant account to determine whether the transaction account associated with the consumer is set as a default payment method on the merchant account. In various embodiments, if the transaction account is not set as a default payment method on the merchant account, requesting module 206 may transmit a request to the consumer seeking a permission to set the transaction account as the default payment method on the merchant account.

In various embodiments, accessing module 208 may determine that the consumer does not have the transaction account added as one of the payment methods on the merchant account. Accessing module 208 may add the transaction account associated with the consumer on the merchant account. In various embodiments, the consumer may be prompted to select from a plurality of individual accounts associated with the transaction account to be added in the merchant account. For example, if there are multiple transaction cards associated with the transaction account, the consumer may select which transaction card to be added in the merchant account.

Instructing module 210 may provide an instruction to the merchant account to select the transaction account associated with the consumer and issued by transaction account issuer 106 as the default payment method for performing any financial transaction on merchant portal 104.

In various embodiments, the computer-based system may determine that the consumer is not associated with a merchant account. The computer-based system may request login credentials associated with the consumer to be used for the merchant account. The default payment setting module 110 may create a merchant account associated with the consumer and the merchant. The default payment setting module may use the login credentials and consumer information to create the account, and the default payment setting module 110 may transmit transaction account information associated with the consumer to the merchant. The default payment setting module 110 may instruct the merchant account to set the transaction account as the default payment method.

In various embodiments, default payment setting module 110 runs as a roboscript, on either the server of transaction account issuer 106 or on the server of a third party service provider, to set the transaction account associated with the consumer as the default payment method on the merchant account.

In various embodiments, default payment setting module 110 notifies the consumer that the transaction account is set as a default payment method on the desired merchants selected by the consumer on the online interface. Thus, the consumer is notified that for any financial transactions that the consumer may undertake on merchant portal 104 of the desired merchants, the financial transaction will be performed through the transaction account associated with the consumer as a default payment method.

In various embodiments, the transaction account information may be updated based on one or more events. The events may include, but are not limited to, expiration of the transaction account, renewal of the transaction account, addition of a supplementary transaction account, theft of a transaction card associated with the transaction account and the like. Correspondingly, default payment setting module 110 may retrieve the stored merchant login credentials from database 108 and access merchant portal 104 using the merchant login credentials associated with the consumer to transmit updated transaction account information to the merchant account. However, in various embodiments, default payment setting module 110 may attempt to access merchant portal 104 and determine that the consumer has updated the merchant login credentials or the merchant login credentials are invalid. In response to determination that the merchant login credentials have changed, default payment setting module 110 may request the consumer to provide the current merchant login credentials associated with the consumer so that the merchant account in the desired merchant portal 104 may be accessed on behalf of the consumer. In various embodiments, the transaction account information may be evergreen, such that whenever the transaction account information changes, the script updates the merchant accounts.

Default payment setting module 110 may transmit the updated transaction account information associated with the transaction account to the merchant account. In various embodiments, the transaction account information may include, but is not limited to, a transaction account number, an expiration date, a billing address, a security code, a routing number, a password, a consumer name, a consumer birth date, and a personal identification number. In various embodiments, the updated transaction account information may be received by transaction account issuer 106 and stored in database 108. In various embodiments, default payment setting module 110 may retrieve the transaction account information from database 108 in response to receiving an alert from transaction account issuer 106 that the transaction account information has been updated. In various embodiments, default payment setting module 110 may periodically check database 108 to determine whether the transaction account information associated with the consumer is updated. In event of an update, default payment setting module 110 may access merchant portal 104 and transmit the updated transaction account information to the merchant account. For example, if default payment setting module 110 determines that a billing address associated with the transaction account is updated by the consumer, the default payment setting module 110 may transmit the transaction account information including the updated billing address to the merchant account. This may enable the consumer to successfully perform the financial transaction on merchant portal 104 through the transaction account as the default payment method. In various embodiments, default payment setting module 110 may seek permission from the consumer before transmitting the updated transaction account information to the merchant account.

In various embodiments, transaction account issuer 106 may offer a reward to the consumer in response to the consumer approving the transaction account associated with the consumer being set as the default payment method on the desired merchant accounts. The reward may include, but is not limited to, loyalty points, a discount on fees, a lower annual percentage rate, waiving an annual fee associated with the transaction account, upgrading a status of the transaction account, upgrading a status of a third-party account, providing access to a club, providing access to discounted products, upgrading a consumer account to a VIP status, providing a preferred bidding status to an item in an auction, providing a preferred access to an item in an auction, and providing a loaded smart card.

In various embodiments, default payment setting module 110 may access the merchant account at periodic intervals and determine whether the transaction account is still the default payment method. In various embodiments, the default payment setting module 110 updates the default payment method such that the transaction account is the default payment method. In various embodiments, in response to the transaction account not being the default payment method, default payment setting module 110 may seek a permission from the consumer to set the transaction account as the default payment method. In response to approval, default payment setting module 110 may instruct the merchant account to set the transaction account as default payment method. In response to denial from the consumer, in various embodiments, default payment setting module 110 may revoke the one or more rewards provided to the consumer earlier which was based on his approval for setting the transaction account as the default payment method.

In various embodiments, the consumer may access the merchant account and indicate through merchant portal 104 to transaction account issuer 106 to provide the transaction account information to the merchant account. This may happen if the consumer has updated his transaction account information which is still not updated with the merchant account, and as a result the consumer may not be able to perform the financial transaction with merchant portal 104 using the transaction account as default payment method. In various embodiments, the consumer may not have added the transaction account to the merchant account. The transaction account issuer 106 may receive a request for the transaction account information from merchant portal 104 and transmit a request to the consumer for permission to transmit the transaction account information to merchant portal 104 to be added or updated in the merchant account. In response to receiving an approval from the consumer, default payment setting module 110 may transmit the transaction account information to the merchant account. In various embodiments, the transaction account information includes the updated information received by transaction account issuer 106.

FIG. 3 is an exemplary illustration 300 illustrating a step of validating transaction account login credentials for a transaction account associated with the consumer. In various embodiments, default payment setting module 110 may receive the transaction account login credentials to access a website associated with transaction account issuer 106. Default payment setting module 110 may retrieve the login credentials from database 108 and validate if the login credentials are valid. In response to validation, default payment setting module 110 may provide an access to the webpage associated with transaction account issuer 106.

FIG. 4 is an exemplary illustration 400 illustrating a step of displaying a list of merchants to the consumer on the webpage associated with transaction account issuer 106. The consumer may select a "PARTNER MERCHANTS" tab on the webpage associated with transaction account issuer 106 to view a list of the merchants associated with transaction account issuer 106. On selection of the "PARTNER MERCHANTS" tab, default payment setting module 110 may provide a list of merchants to the consumer. The consumer may select the desired merchants by selecting radio buttons 410 provided adjacent to the name of the merchants. The consumer may indicate the desired merchants by any other method known in the art. In various embodiments, the consumer may be requested to provide merchant login credentials on the same webpage for the desired merchants. In various embodiments, default payment setting module 110 may store the merchant login credentials associated with the consumer in database 108 for future retrieval.

Figure 5:
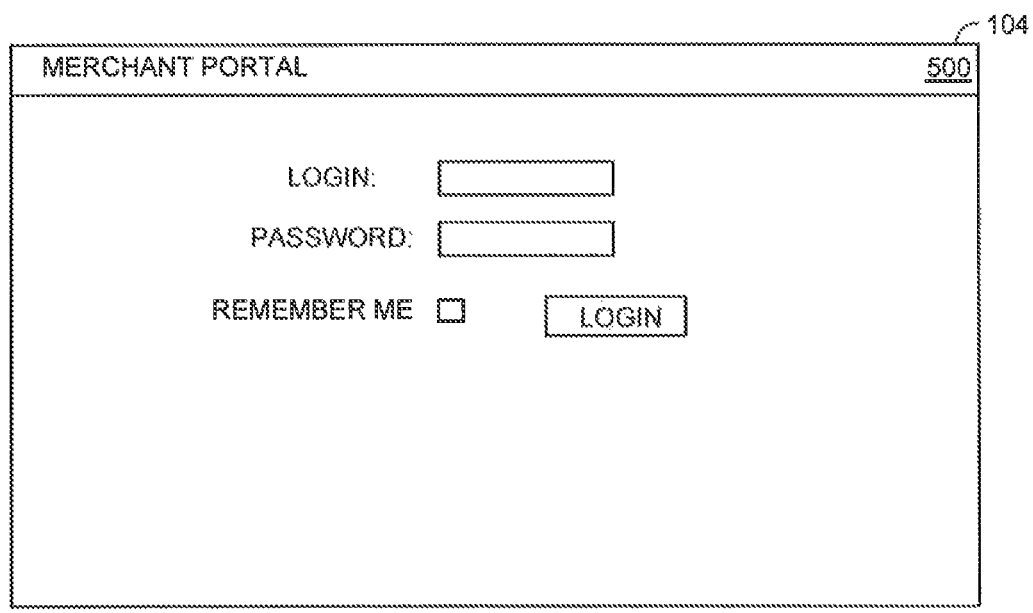
FIG. 5 is an exemplary login page on a merchant portal, according to various embodiments.

FIG. 5 is an exemplary illustration 500 illustrating a step of accessing into merchant portal 104. Default payment setting module 110 may access merchant portal 104 on behalf of the consumer using the merchant login credentials associated with the consumer. In various embodiments, if the merchant login credentials have changed or are invalid, default payment setting module 110 may request the consumer to provide the current merchant login credentials associated with the consumer.

FIG. 6 is an exemplary illustration 600 illustrating a step of instructing the merchant account to set a default payment method. In response to accessing into merchant portal 104 using the merchant login credential associated with the consumer, default payment setting module 110 may access the merchant account payment methods by clicking on the "PAYMENT METHODS" tab. The merchant account may include one or more payment methods added by the consumer to perform a financial transaction through merchant portal 104. Default payment setting module 110 may select the transaction account issued by transaction account issuer 106 and set that as the default payment method on the merchant account for any future transaction that the consumer may undertake on that merchant portal 104. In various embodiments, default payment setting module 110 may transmit a request to the consumer seeking a permission to make the transaction account the default payment method on the merchant account.

In various embodiments, default payment setting module 110 may determine that the consumer does not have the transaction account added as one of the payment methods on the merchant account. Default payment setting module 110 may add the transaction account associated with the consumer on the merchant account. In various embodiments, the consumer may be prompted to select from a plurality of individual account associated with the transaction account to be added to the merchant account.

Default payment setting module 110 may provide an instruction to the merchant account to select the transaction account associated with the consumer, and issued by transaction account issuer 106, as the default payment method for performing any financial transaction on merchant portal 104.

Figure 7:
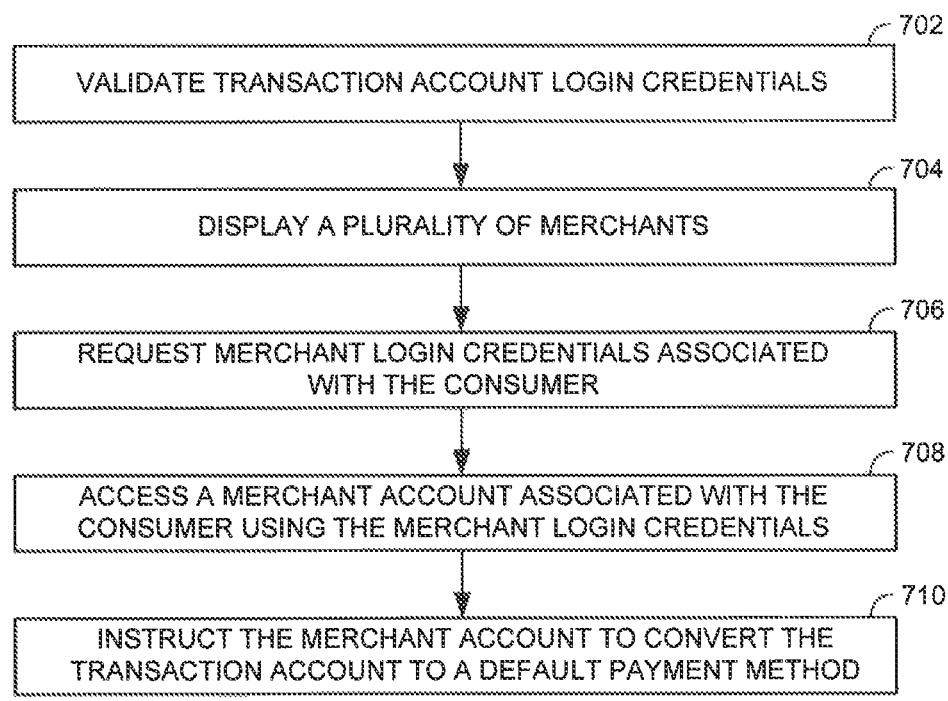
FIG. 7 is a flowchart illustrating an example process for setting the default payment method on the merchant account associated with the consumer, according to various embodiments.
Figure 8:
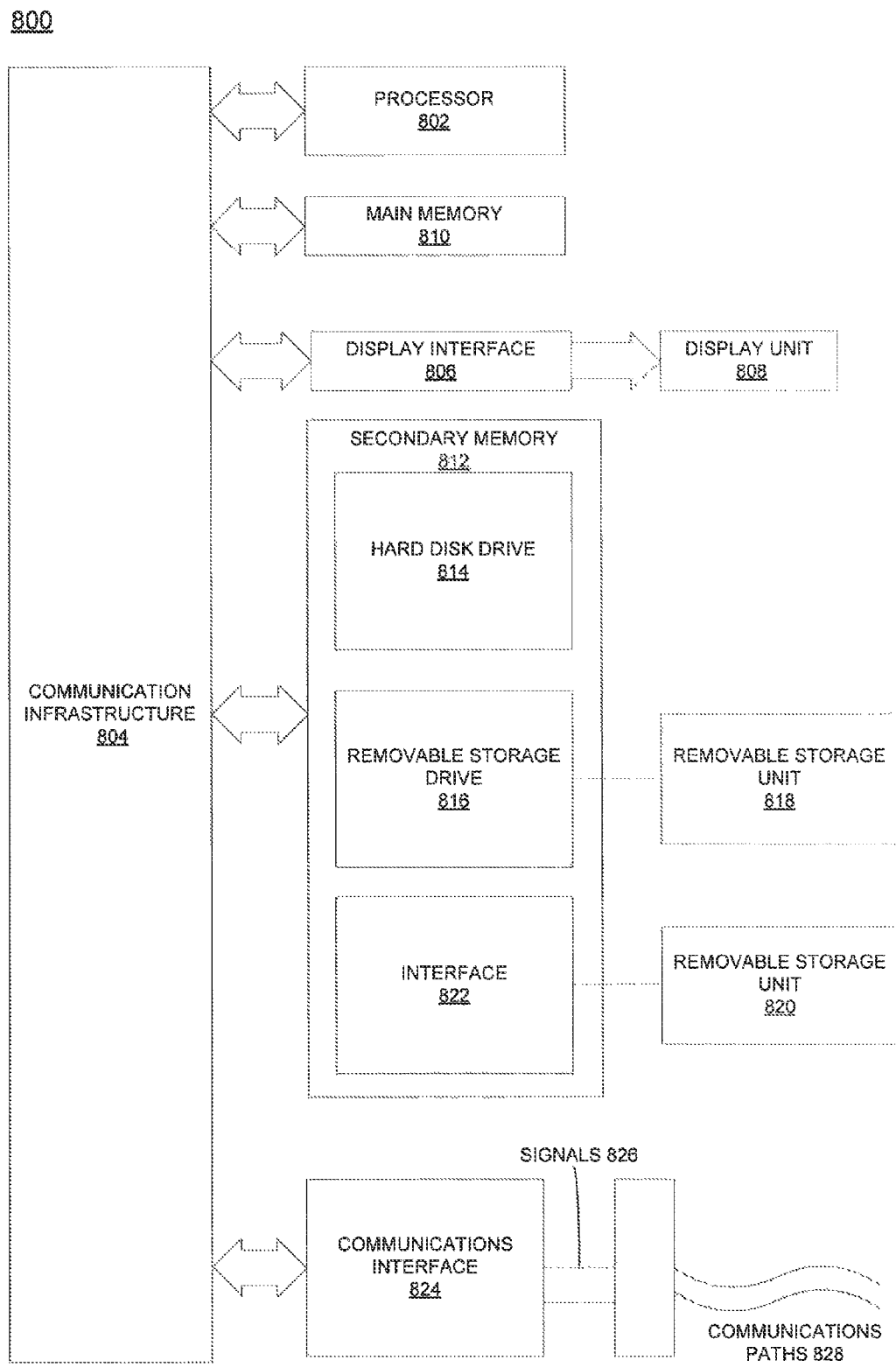
FIG. 8 is a block diagram of an exemplary computer system, according to various embodiments.

FIG. 7 is a flow chart 700 illustrating one example process of default payment setting method.

In various embodiments, a computer based system receives transaction account login credentials associated with the consumer on a secure area of a transaction account website. The transaction account website may include an online interface associated with transaction account issuer 106.

In step 702, a computer-based system validates the transaction account login information associated with the consumer and may subsequently provide an access to the transaction account website. The computer-based system may include default payment setting module 110. In various embodiments, default payment setting module 110 may be implemented on a server of transaction account issuer 106 or on a server of a third party service provider.

In response to a successful login into the online interface associated with transaction account issuer 106, the consumer may select to access a list of merchants from the online interface. In response to the selection, in step 704, computer-based system may display a plurality of merchants to the consumer. In various embodiments, the displayed merchants may have one or more business contracts with transaction account issuer 106.

In step 706, computer-based system may request the consumer to select the one or more merchants as desired merchants and provide the merchant login credentials associated with the consumer for the desired merchants. In various embodiments, computer-based system may store the merchant login credentials associated with the consumer in database 108 for future retrieval.

In response to receiving the merchant login credentials from the consumer, in step 708 the computer-based system may access merchant portal 104 associated with the desired merchants, using the merchant login credentials received from the consumer. Computer-based system may further access the merchant account associated with the consumer on merchant portal 104. The merchant account may include one or more payment methods to perform a financial transaction through merchant portal 104. Computer-based system may access the merchant account to determine whether the transaction account associated with the consumer is set as a default payment method on the merchant account. In various embodiments, if the transaction account is not set as a default payment method on the merchant account, then requesting module 206 may transmit a request to the consumer seeking a permission to make the transaction account as the default payment method on the merchant account.

In various embodiments, computer-based system may determine that the consumer does not have a transaction account added as one of the payment method on the merchant account to perform a financial transaction on merchant portal 104. Subsequently, computer-based system may add the transaction account associated with the consumer on the merchant account. In various embodiments, the consumer may be prompted to select from a plurality of individual account associated with the transaction account to be added in the merchant account. For example, if there are multiple transaction cards associated with the transaction account, the consumer may select which transaction card to be added in the merchant account.

In step 710, computer-based system may provide an instruction to the merchant account to select the transaction account associated with the consumer and issued by transaction account issuer 106 as the default payment method for performing any financial transaction on merchant portal 104.

In various embodiments, either transaction account issuer 106 or a third party service provider may enable the computer-based system to run a script to login to merchant portal 104 on behalf of the consumer and subsequently, set the transaction account associated with the consumer as the default payment method on the merchant account. In various embodiments, if the computer-based system determines that the transaction account information associated with the consumer is updated, the computer-based system may transmit the updated transaction account information to the merchant account.

In various embodiments, computer-based system also notifies the consumer that the transaction account is set as a default payment method on the desired merchants selected by the consumer on the online interface. Thus, the consumer is notified that for any financial transactions that the consumer may undertake on merchant portal 104 of the desired merchants, the financial transaction will be performed through the transaction account associated with the consumer as a default payment methodIn various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nujiten to fall outside the scope of patentable subject matter under 35 U.S.C. §101.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to at least one of A, B, and C or at least one of A, B, or C is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The present disclosure (i.e., Default Payment Setting Module, process 700, any part(s) or function(s) thereof) may be implemented using hardware, software or a combination thereof, and may be implemented in one or more computer systems or other processing systems. However, the manipulations performed by the disclosure were often referred to in terms, such as comparing or checking, which are commonly associated with mental operations performed by a human operator. No such capability of a human operator is necessary, or desirable in most cases, in any of the operations described herein, which form a part of the system. Rather, the operations are machine operations. Useful machines for performing the operations in the system may include general-purpose digital computers or similar devices.

In fact, in accordance with various embodiments, the system is directed towards one or more computer systems capable of carrying out the functionality described herein. The computer system 800 may include at least one processor, such as a processor 802. Processor 802 is connected to a communication infrastructure 804, for example, a communications bus, a cross over bar, a network, and the like. Various software embodiments are described in terms of this exemplary computer system 800. After reading this description, it will become apparent to a person skilled in the relevant art(s) how to implement the system using other computer systems and/or architectures.

The computer system 800 may include a display interface 806 that forwards graphics, text, and other data from the communication infrastructure 804 for display on a display unit 808.

The computer system 800 may further include a main memory 810, such as random access memory (RAM), and may also include a secondary memory 812. The secondary memory 812 may further include, for example, a hard disk drive 814 and/or a removable storage drive 816, representing a floppy disk drive, a magnetic tape drive, an optical disk drive, etc. The removable storage drive 816 may read from and/or write to a removable storage unit 818 in a well known manner. The removable storage unit 818 may represent a floppy disk, magnetic tape or an optical disk, and may be read by and written to by the removable storage drive 816. As will be appreciated, the removable storage unit 818 may include a computer usable storage medium having stored therein, computer software and/or data.

In accordance with various embodiments of the system, the secondary memory 812 may include other similar devices for allowing computer programs or other instructions to be loaded into the computer system 800. Such devices may include, for example, a removable storage unit 820, and an interface 822. Examples of such may include a program cartridge and cartridge interface (such as that found in video game devices), a removable memory chip (such as an erasable programmable read only memory (EPROM), or programmable read only memory (PROM)) and associated socket, and other removable storage units 820 and interfaces 822, which allow software and data to be transferred from the removable storage unit 820 to the computer system 800.

The computer system 800 may further include a communication interface 824. The communication interface 824 allows software and data to be transferred between the computer system 800 and external devices. Examples of the communication interface 824 include, but may not be limited to a modem, a network interface (such as an Ethernet card), a communications port, a Personal Computer Memory Card International Association (PCMCIA) slot and card, and the like. Software and data transferred via the communication interface 824 are in the form of a plurality of signals, hereinafter referred to as signals 826, which may be electronic, electromagnetic, optical or other signals capable of being received by the communication interface 824. The signals 826 are provided to the communication interface 824 via a communication path (e.g., channel) 828. The communication path 828 carries the signals 826 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 816, a hard disk installed in hard disk drive 814, the signals 826, and the like. These computer program products provide software to the computer system 800. The disclosure is directed to such computer program products.

Computer programs (also referred to as computer control logic) may be stored in the main memory 810 and/or the secondary memory 812. Computer programs may also be received via the communication interface 804. Such computer programs, in response to being executed, enable the computer system 800 to perform the features of the disclosure, as discussed herein. In particular, the computer programs, when executed, enable the processor 802 to perform the features of the disclosure. Accordingly, such computer programs represent controllers of the computer system 800.

In accordance with various embodiments, where the system is implemented using software, the software may be stored in a computer program product and loaded into the computer system 800 using the removable storage drive 816, the hard disk drive 814 or the communication interface 824. The control logic (software), in response to being executed by the processor 802, may cause the processor 802 to perform the functions of the system as described herein.

In various embodiments, the system may be implemented primarily in hardware using, for example, hardware components such as application specific integrated circuits (ASIC). Implementation of the hardware state machine so as to perform the functions described herein will be apparent to persons skilled in the relevant art(s). In various embodiments, the system is implemented using a combination of both the hardware and the software.

While various embodiments have been described above, it should be understood that they have been presented by way of example, and not limitation. It will be apparent to persons skilled in the relevant art(s) that various changes in form and detail can be made therein without departing from the spirit and scope of the disclosure. Thus, the disclosure should not be limited by any of the above described exemplary embodiments, but should be defined only in accordance with the following claims and their equivalents.

In addition, it should be understood that the figures illustrated in the attachments, which highlight the functionality and advantages of the disclosure, are presented for example purposes only. The architecture of the system is sufficiently flexible and configurable, such that it may be utilized (and navigated) in ways other than that shown in the accompanying figures.

The invention claimed is:

1. A computer-implemented method comprising:
validating, by a computer-based system, transaction account login credentials for a transaction account associated with a consumer, by comparing to stored transaction account login credentials in a database;

displaying, by the computer-based system using a displaying module, on a graphical user interface and in response to the validating, a plurality of merchants;

requesting, by the computer-based system using a requesting module, merchant login credentials associated with the consumer, wherein the merchant login credentials are entered by the consumer via an online interface associated with the computer-based system;

determining, by the computer-based system, that the merchant login credentials have changed;

requesting, by the computer-based system on the graphical user interface and in response to the determining, new merchant login credentials from the consumer;

running, by the computer-based system using default payment setting module, a roboscripting on the computer-based system such that the computer-based system logs into the merchant account via a merchant portal by using the new merchant login credentials from the consumer;

accessing, by the computer-based system using accessing module, and using the roboscripting and using the new merchant login credentials and in response to the requesting new merchant login credentials, a merchant account associated with the consumer, wherein the merchant account is located on a merchant server;

determining, by the computer-based system, whether the transaction account is the online default payment method provided in the merchant account on the merchant server;

transmitting, by the computer-based system on the graphical user interface, a request to the consumer seeking permission to set the transaction account as the online default payment method on the merchant account on the merchant server, sending code, by the computer-based system using the roboscripting in real-time, to the merchant account on the merchant server such that the default payment setting module runs as a roboscript to instruct the merchant account to convert the transaction account to the online default payment method in response to the transmitting and to expedite the online checkout process; and transmitting, by the computer-based system using the roboscripting in real-time, updated transaction account information associated with the transaction account to the merchant account on the merchant server in response to the consumer updating in real-time the transaction account information and to expedite the online checkout process.

2. The method of claim 1, wherein the accessing the merchant account and determining whether the transaction account is the online default payment method occurs at periodic intervals.

3. The method of claim 1, further comprising determining, by the computer-based system, that the consumer is not associated with a merchant account; and creating, by the computer-based system, a merchant account associated with the consumer.

4. The method of claim 3, further comprising prompting, by the computer-based system, the user to select from a plurality of individual accounts associated with the transaction account to make the online default payment method.

5. The method of claim 1, further comprising notifying, by the computer-based system, the consumer that the transaction account was set as the online default payment method.

6. The method of claim 1, further comprising offering, by the computer-based system, a reward to the consumer, wherein the reward comprises at least one of loyalty points, a discount on fees, a lower annual percentage rate, waiving an annual fee associated with the transaction account, upgrading a status of the transaction account, upgrading a status of a third-party account, providing access to a club, providing access to discounted products, upgrading a consumer account to a VIP status, providing a preferred bidding status to an item in an auction, providing a preferred access to an item in an auction, or providing a loaded smart card.

7. The method of claim 1, further comprising receiving, by the computer-based system an updated billing address associated with the transaction account.

8. The method of claim 7, further comprising transmitting, by the computer-based system and in response to receiving the updated billing address, the updated billing address to the merchant account.

9. The method of claim 1, further comprising:

receiving, by the computer-based system, a request for the transaction account information from the merchant account; and transmitting, by the computer-based system and to the consumer, a request for permission to transmit the transaction account information to the merchant.

10. The method of claim 1, further comprising accessing, by the computer-based system and using the merchant login credentials, a plurality of merchant accounts associated with the consumer.

11. The method of claim 1, wherein the transaction account information comprises at least one of a transaction account number, an expiration date, a billing address, a security code, a routing number, a password, a consumer name, a consumer birth date, or a personal identification number.

12. The method of claim 1, further comprising:

determining, by the computer-based system, that the merchant login credentials have changed;

requesting, by the computer-based system, new merchant login credentials from the consumer; and determining, by the computer-based system, that the transaction account is not the online default payment method for the merchant account.

13. The method of claim 1, further comprising:

storing, by the computer-based system, merchant login credentials for a plurality of merchant accounts associated with the consumer in a database;

accessing, by the computer-based system and in response to determining that the transaction account information has been updated, the plurality of merchant accounts using the merchant login credentials; and transmitting, by the computer-based system, updated transaction account information to the plurality of merchant accounts.

14. A system comprising:

a processor;

a tangible, non-transitory memory configured to communicate with the processor, the tangible, non-transitory memory having instructions stored thereon;

a validating module configured to validate transaction account login credentials for a transaction account associated with a consumer, by comparing to stored transaction account login credentials in a database;

a displaying module configured to transmit data to display a plurality of merchants;

a requesting module configured to request merchant login credentials associated with the consumer, to determine that the merchant login credentials have changed, and to request new merchant login credentials from the consumer;

wherein the merchant login credentials are entered by the consumer via an online interface associated with the computer-based system;

a default payment setting module running configured to run a roboscripting on the system such that the system logs into the merchant account via a merchant portal by using the new merchant login credentials from the consumer;

an accessing module configured to, using the roboscripting, access a merchant account associated with the consumer using the new merchant login credentials and to determine whether the transaction account is the online default payment method on the merchant account, wherein the merchant account is located on a merchant server;

a transmitting module configured to transmit a request to the consumer requesting permission to set the transaction account as the online default payment method on the merchant account, and an instructing module configured to provide code to, using roboscripting, instruct the merchant account to convert the transaction account to the online default payment method in response to the transmitting and to expedite the online checkout process; and the instructing module further configured to provide code in real-time such that the default payment setting module runs as a roboscript to update, using roboscripting, transaction account information associated with the transaction account in response to the consumer updating in real-time the transaction account information and to expedite the online checkout process.

15. An article of manufacture including a non-transitory, tangible computer readable storage medium having instructions stored thereon that, in response to execution by a computer-based system, cause the computer-based system to perform operations comprising:

validating, by the computer-based system, transaction account login credentials for a transaction account associated with a consumer, by comparing to stored transaction account login credentials in a database;

displaying, by the computer-based system using a displaying module, on a graphical user interface and in response to the validating, a plurality of merchants;

requesting, by the computer-based system using a requesting module, merchant login credentials associated with the consumer, wherein the merchant login credentials are entered by the consumer via an online interface associated with the computer-based system;

determining, by the computer-based system, that the merchant login credentials have changed;

requesting, by the computer-based system on the graphical user interface and in response to the determining, new merchant login credentials from the consumer;

running, by the computer-based system using default payment setting module, a roboscripting on the computer-based system such that the computer-based system logs into the merchant account via a merchant portal by using the new merchant login credentials from the consumer;

accessing, by the computer-based system using accessing module, and using the roboscripting and using the new merchant login credentials and in response to the requesting new merchant login credentials, a merchant account associated with the consumer, wherein the merchant account is located on a merchant server;

determining, by the computer-based system, whether the transaction account is the online default payment method provided in the merchant account on the merchant server;

transmitting, by the computer-based system on the graphical user interface, a request to the consumer seeking permission to set the transaction account as the online default payment method on the merchant account on the merchant server, sending code, by the computer-based system using the roboscripting in real-time, to the merchant account on the merchant server such that the default payment setting module runs as a roboscript to instruct the merchant account to convert the transaction account to the online default payment method in response to the transmitting and to expedite the online checkout process; and transmitting, by the computer-based system using the roboscripting in real-time, updated transaction account information associated with the transaction account to the merchant account on the merchant server in response to the consumer updating in real-time the transaction account information and to expedite the online checkout process.

16. The method of claim 1, further comprising updating, by the computer-based system, the transaction account that is used for the online default payment method in response to at least one of information changes in the transaction account, expiration of the transaction account, renewal of the transaction account, addition of a supplementary transaction account, or theft of a transaction card associated with the transaction account.

\* \* \* \* \*